(12) United States Patent
Shinde et al.

(10) Patent No.: US 12,110,810 B2
(45) Date of Patent: Oct. 8, 2024

(54) GAS TURBINE ENGINE BLEED AIR FLOW CONTROL

(71) Applicant: General Electric Company, Schenectady, NY (US)

(72) Inventors: Kudum Shinde, Bengaluru (IN); Sesha Subramanian, Bengaluru (IN); Yashpal Patel, Bengaluru (IN)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 18/158,618

(22) Filed: Jan. 24, 2023

(65) Prior Publication Data

US 2024/0159157 A1    May 16, 2024

(30) Foreign Application Priority Data

Nov. 16, 2022  (IN) .............................. 202211065710

(51) Int. Cl.

| | |
|---|---|
| *F01D 9/06* | (2006.01) |
| *F01D 17/10* | (2006.01) |
| *F01D 17/14* | (2006.01) |
| *F02C 6/08* | (2006.01) |
| *F02C 9/18* | (2006.01) |

(52) U.S. Cl.
CPC ............. *F01D 9/06* (2013.01); *F01D 17/105* (2013.01); *F01D 17/145* (2013.01); *F02C 6/08* (2013.01); *F02C 9/18* (2013.01); *F05D 2220/323* (2013.01); *F05D 2240/14* (2013.01); *F05D 2260/232* (2013.01); *F05D 2260/605* (2013.01); *F05D 2260/606* (2013.01)

(58) Field of Classification Search
CPC ........ F01D 9/06; F01D 17/105; F01D 17/145; F02C 6/08; F02C 9/18; F05D 2220/323; F05D 2240/14; F05D 2260/232; F05D 2260/605; F05D 2260/606

See application file for complete search history.

(56) References Cited

U.S. PATENT DOCUMENTS

| | | | |
|---|---|---|---|
| 4,236,869 A | 12/1980 | Laurello | |
| 4,807,433 A | 2/1989 | Maclin et al. | |
| 5,059,093 A * | 10/1991 | Khalid ................. | F04D 29/522 |
| | | | 415/115 |
| 5,211,003 A * | 5/1993 | Samuel ..................... | F02C 6/08 |
| | | | 60/751 |
| 5,845,482 A | 12/1998 | Carscallen | |
| 6,325,595 B1 * | 12/2001 | Breeze-Stringfellow ................... | |
| | | | F01D 17/10 |
| | | | 415/144 |

(Continued)

*Primary Examiner* — Loren C Edwards
(74) *Attorney, Agent, or Firm* — Dority & Manning, P.A.

(57) ABSTRACT

A gas turbine engine includes a compressor with an inner casing and an outer casing. The inner casing defines a primary flow path for airflow through the compressor, the inner casing and the outer casing define a bleed air cavity therebetween. The inner casing at least partially defines a first bleed air channel between the primary flow path and the first bleed air cavity. The first bleed air channel is defined between a first wall and a second wall, wherein the first wall is upstream from the second wall. The first wall includes a plurality of holes in fluid communication with the primary flow path and fluidly coupled to a suction manifold. The plurality of holes is configured to energize a fluid boundary layer along the first wall.

18 Claims, 9 Drawing Sheets

(56) References Cited

U.S. PATENT DOCUMENTS

| | | |
|---|---|---|
| 8,578,719 B2 | 11/2013 | Kirby |
| 9,982,598 B2 | 5/2018 | Pritchard, Jr. et al. |
| 10,107,109 B2 | 10/2018 | McCaffrey |
| 10,287,992 B2 | 5/2019 | Tan et al. |
| 2009/0209976 A1 | 8/2009 | Rosielle |
| 2012/0275912 A1* | 11/2012 | Moniz .................. F04D 29/545 |
| | | 415/199.5 |
| 2015/0159560 A1 | 6/2015 | Kumar et al. |

* cited by examiner

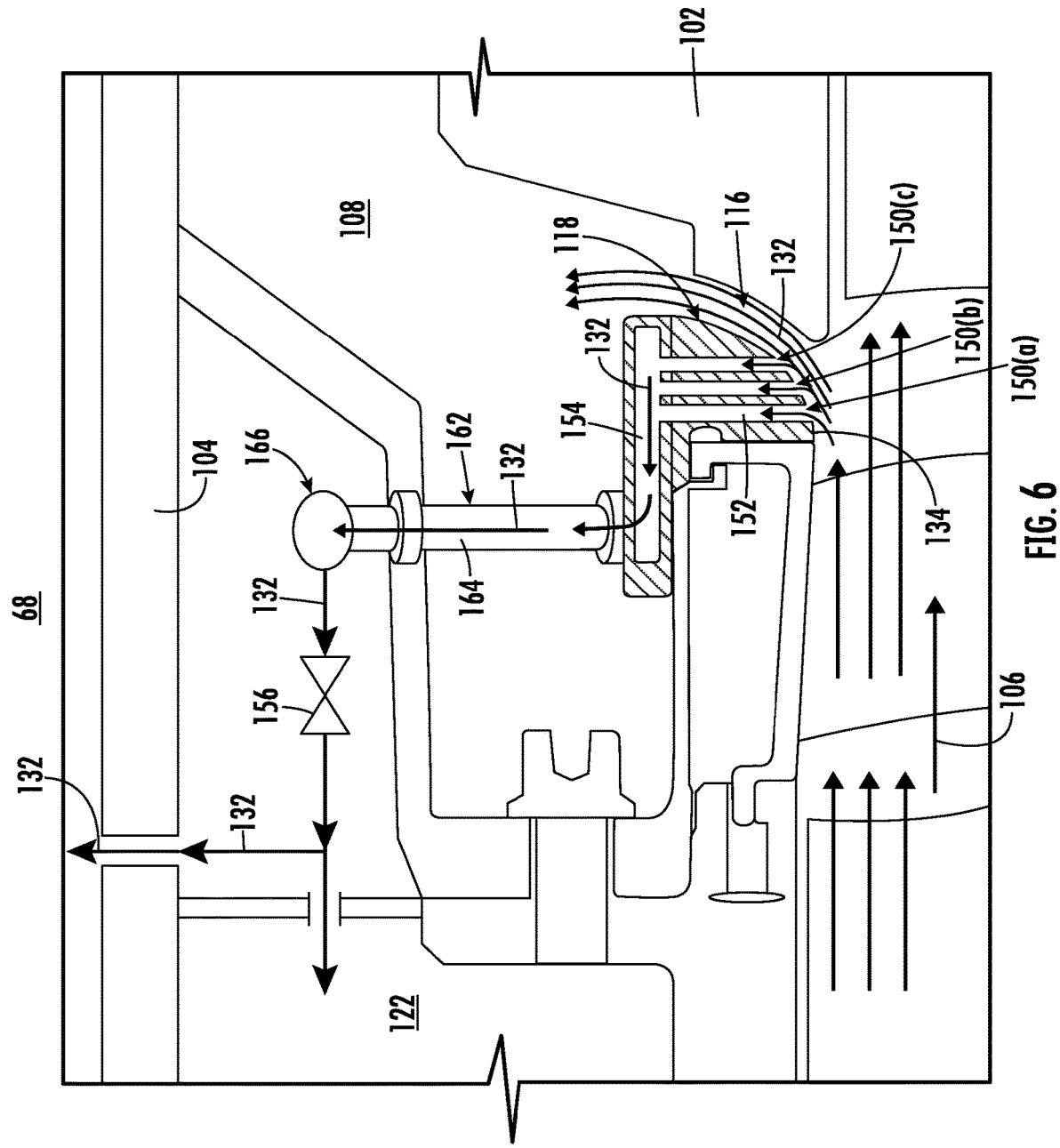

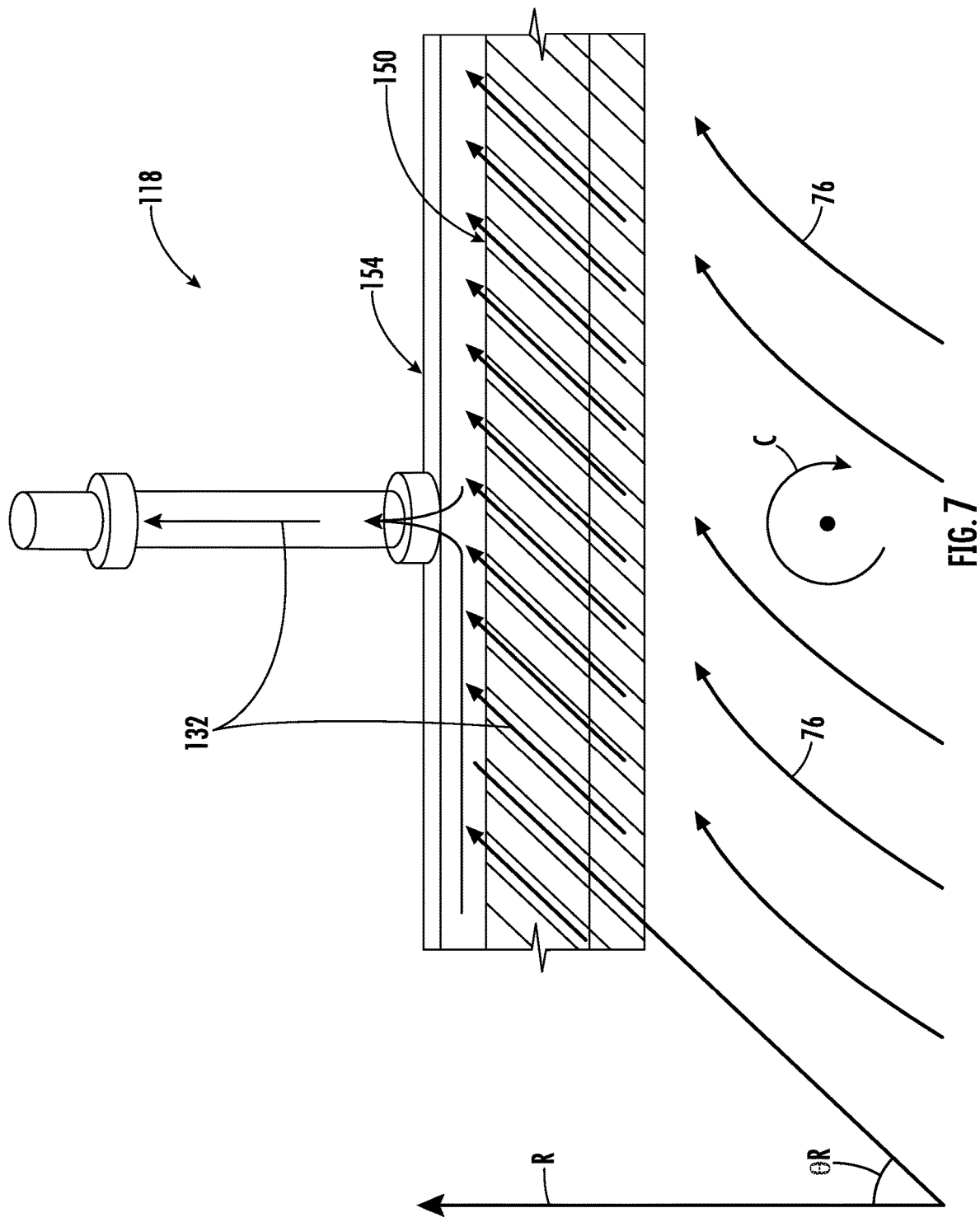

GAS TURBINE ENGINE BLEED AIR FLOW CONTROL

PRIORITY INFORMATION

The present application claims priority to Indian Patent Application Number 202211065710 filed on Nov. 16, 2022.

FIELD

The present disclosure relates to a gas turbine engine and, more particularly, to bleed air flow control.

BACKGROUND

Gas turbine engines, such as turbofan engines, may be used for aircraft propulsion. A turbofan engine generally includes a fan and a gas turbine engine or core engine to drive the fan. The gas turbine engine includes compressor section, a combustor, and a turbine section in a serial flow arrangement. Some gas turbine engines extract high pressure air from the compressor section, known as "bleed air." This bleed air can be used to pressurize a cabin of an aircraft, to provide cooling to one or more parts of the engine and/or to power one or more systems of the aircraft.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 6 is an enlarged cross section of a portion of a high-pressure compressor as shown in FIG. 3, in accordance with an exemplary aspect of the present disclosure.

FIG. 7 is a cross-sectioned, forward-looking aft schematic view of a portion of a first wall including a suction manifold and representative holes, in accordance with an exemplary aspect of the present disclosure.

Figure 1:
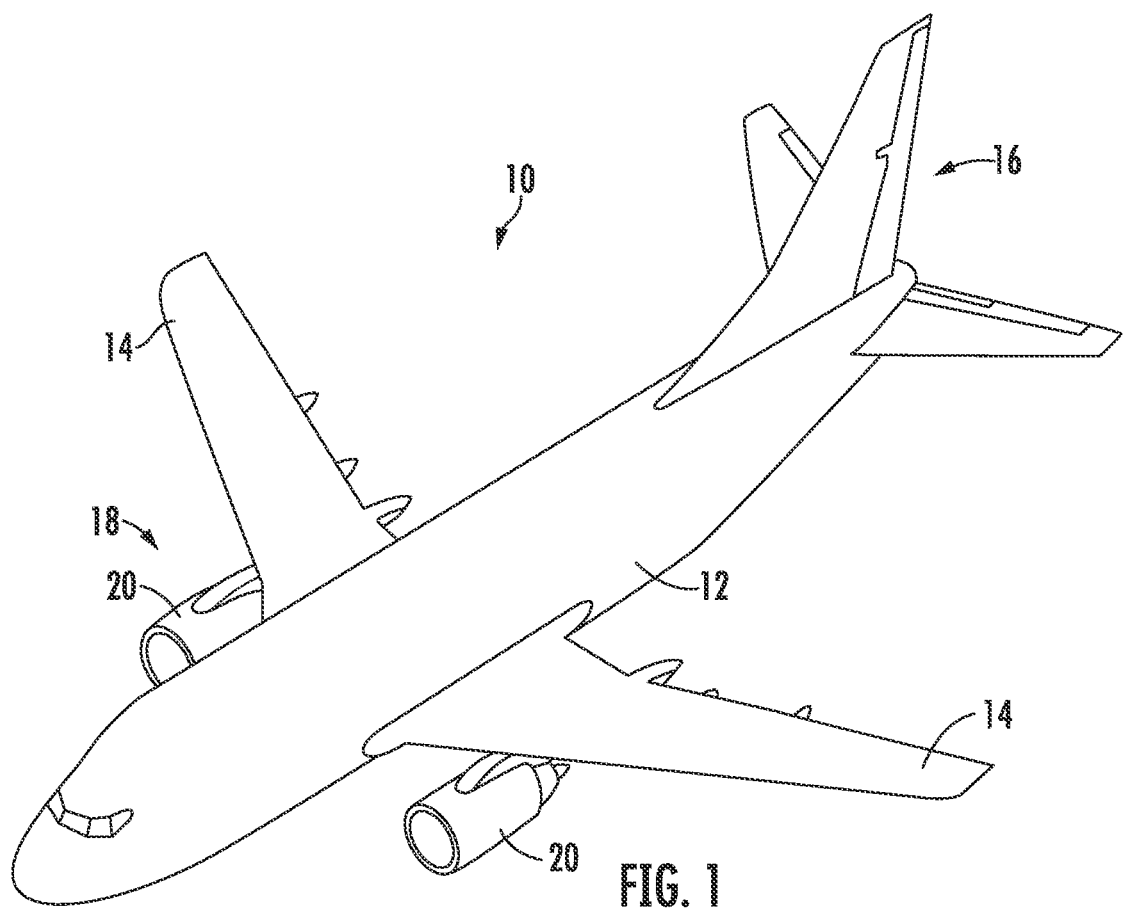
FIG. 1 is a perspective view of an exemplary aircraft in accordance with an exemplary aspect of the present disclosure.

Repeat use of reference characters in the present specification and drawings is intended to represent the same or analogous features or elements of the present disclosure.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary. The singular forms "a", "an", and "the" include plural references unless the context clearly dictates otherwise. The term "at least one of" in the context of, e.g., "at least one of A, B, and C" refers to only A, only B, only C, or any combination of A, B, and C.

As used herein, the terms "first", "second", and "third" may be used interchangeably to distinguish one component from another and are not intended to signify location or importance of the individual components. Furthermore, the terms "upstream" and "downstream" refer to the relative direction with respect to fluid flow in a fluid pathway. For example, "upstream" refers to the direction from which the fluid flows, and "downstream" refers to the direction to which the fluid flows.

The term "turbomachine" refers to a machine including one or more compressors, a heat generating section (e.g., a combustion section), and one or more turbines that together generate a torque output. The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The present disclosure is generally related to high-pressure compressor bleed air extraction flow control for a gas turbine engine. A gas turbine engine generally includes a compressor section including a low-pressure compressor and a high-pressure compressor, a combustion section, and a turbine section arranged in serial-flow order. The compressor section includes a compressor casing that encases sequential rows of stator vanes and rotor blades of the low-pressure and high-pressure compressors. During operation, low-pressure bleed air is extracted from the high-pressure compressor and is routed into a low-pressure bleed air cavity via a low-pressure bleed air channel. High-pressure bleed air is extracted from the high-pressure compressor and is routed to a high-pressure bleed air cavity via a high-pressure bleed air channel. The low-pressure and high-pressure bleed air is then distributed from the respective bleed air cavity via various pipes or tubes to cool turbine components and/or to service/support a variety of aircraft systems including but not limited to cabin air pressurization systems, air conditioning, fuel tank pressurization, thrust reverse system, fuel heating, anti-icing systems, etc.

The low-pressure and the high-pressure bleed air channels are generally formed in the compressor casing between a respective row of stator vanes and an adjacent row of turbine rotor blades. In particular, the high-pressure bleed air channel is defined by a first wall and a second wall of the casing. The second wall is downstream of the first wall, or, said another way, the first wall is upstream of the second wall.

Therefore, the first and second walls may also be referred to as upstream and downstream walls, respectively.

During high power operation of the engine, the pressure of the low-pressure bleed air is generally sufficient to maintain operation of the various engine and aircraft systems including the cabin pressurization and air conditioning systems. However, during low power operation of the engine (taxiing, landing, etc.) or loss/deactivation of a secondary engine, the pressure of the low-pressure bleed air from the low-pressure bleed air cavity may not be sufficient to service the various engine and aircraft systems, particularly the cabin pressurization system. As such, the low-pressure bleed air may be supplemented with the high-pressure bleed air from the high-pressure bleed air cavity.

While some engine conditions, such as low power operation, the high-pressure bleed air may flow smoothly through the high-pressure bleed air channel. In other conditions, such as during high power operating conditions, the flowrate of the high-pressure bleed air out of the high-pressure bleed air cavity is less than the potential supply flowrate of bleed air flowing from the high-pressure compressor through the high-pressure bleed air channel. This results in boundary layer separation of the flow of high-pressure bleed air along the first wall within the high-pressure bleed air extraction channel, thereby resulting in an undesirable recirculation zone or bubble within the high-pressure extraction channel.

The recirculation zone or bubble reduces or limits bleed air pressure recovery and pressure in the high-pressure bleed air cavity. Bleed air pressure recovery is the percentage of dynamic pressure (difference between total and static pressure) that gets recovered. Bleed air cavity pressure is the static pressure plus the recovered dynamic pressure. Therefore, it is typically desired to increase or improve pressure recovery, which equates to more high-pressure bleed air cavity pressure and therefore more pressure margin for use in the pressurization and cooling systems.

Disclosed herein is a system for improving bleed pressure recovery by minimizing a flow or a boundary layer separation within the extraction channel using boundary layer suction upstream of the high-pressure bleed air channel. The suction essentially energizes or imparts momentum into the high-pressure bleed air area along the first wall, which reduces (e.g., minimizes, delays, etc.) the flow separation along the first wall and within the high-pressure bleed air channel.

In certain configurations, holes in a portion of the compressor casing at the first wall of the high-pressure bleed air channel create suction. A fraction of the high-pressure bleed air is suctioned away via the holes to delay/avoid boundary layer separation in the high-pressure bleed air channel. The holes essentially energize the boundary layer near a potential recirculation zone within the high-pressure bleed air channel.

In certain embodiments, the holes are fluidly coupled to a suction manifold that surrounds the compressor casing. The suction manifold may be fluidly coupled to a pipe, tube, or conduit for routing the suctioned bleed air to low-pressure regions in the engine such as but not limited to the low-pressure bleed air cavity. In certain configurations, the suction flowrate is modulated using a flow control valve. The flow control valve may be connected to a controller such as a Full Authority Digital Engine Control EEC/FADEC. The controller may instruct the flow control valve to actuate open, closed, or to an intermediate position based on inputs received at the controller which provide information that may be used to determine recirculation bubble size. The valve is fluidly coupled to and placed downstream from the tube.

The bleed system disclosed herein may further provide acoustic benefits, e.g., reducing resonance time. Additionally, or alternatively, the bleed system may be tuned to reduce or eliminate cavity resonance. Additionally, or alternatively, the bleed system may be implemented in new gas turbine designs and/or may be retrofitted to existing engines.

Referring now to the drawings, FIG. 1 is a perspective view of an exemplary aircraft 10 that may incorporate at least one exemplary embodiment of the present disclosure. As shown in FIG. 1, the aircraft 10 has a fuselage 12, wings 14 attached to the fuselage 12, and an empennage 16. The aircraft 10 further includes a propulsion system 18 that produces a propulsive thrust to propel the aircraft 10 in flight, during taxiing operations, etc. Although the propulsion system 18 is shown attached to the wing(s) 14, in other embodiments it may additionally or alternatively include one or more aspects coupled to other parts of the aircraft 10, such as, for example, the empennage 16, the fuselage 12, or both. The propulsion system 18 includes at least one engine. In the exemplary embodiment shown, the aircraft 10 includes a pair of gas turbine engines 20. Each gas turbine engine 20 is mounted to the aircraft 10 in an under-wing configuration. Each gas turbine engine 20 is capable of selectively generating a propulsive thrust for the aircraft 10. The gas turbine engines 20 may be configured to burn various forms of fuel including, but not limited to unless otherwise provided, jet fuel/aviation turbine fuel, and hydrogen fuel.

Figure 2:
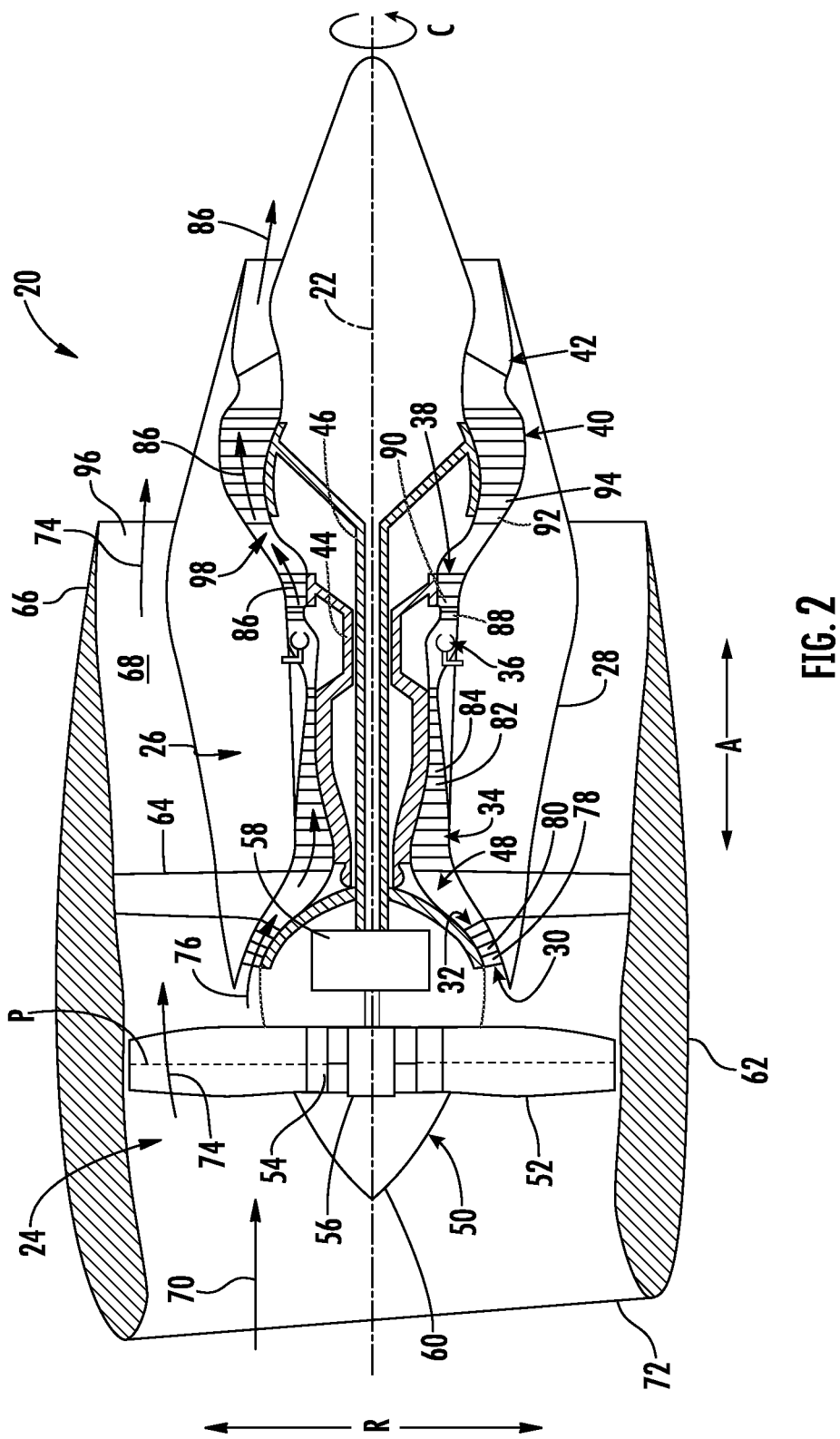
FIG. 2 is a cross-sectional view of an exemplary gas turbine engine in accordance with an exemplary aspect of the present disclosure.

FIG. 2 is a cross-sectional side view of a gas turbine engine 20 in accordance with an exemplary embodiment of the present disclosure. More particularly, for the embodiment of FIG. 2, the gas turbine engine 20 is a multi-spool, high-bypass turbofan jet engine, sometimes also referred to as a "turbofan engine." As shown in FIG. 2, the gas turbine engine 20 defines an axial direction A (extending parallel to a longitudinal centerline 22 provided for reference), a radial direction R, and a circumferential direction C extending about the longitudinal centerline 22. In general, the gas turbine engine 20 includes a fan section 24 and a turbomachine 26 disposed downstream from the fan section 24.

The exemplary turbomachine 26 depicted generally includes an outer casing 28 that defines an annular core inlet 30. The outer casing 28 at least partially encases, in serial flow relationship, an axial compressor section including a booster or low-pressure (LP) compressor 32 and a high-pressure (HP) compressor 34, a combustion section 36, a turbine section including a high-pressure (HP) turbine 38 and a low-pressure (LP) turbine 40, and a jet exhaust nozzle 42.

A high-pressure (HP) shaft 44 drivingly connects the HP turbine 38 to the HP compressor 34. A low-pressure (LP) shaft 46 that drivingly connects the LP turbine 40 to the LP compressor 32. The LP compressor 32, the HP compressor 34, the combustion section 36, the HP turbine 38, the LP turbine 40, and the jet exhaust nozzle 42 together define a working gas flow path 48 through the gas turbine engine 20.

For the embodiment depicted, the fan section 24 includes a fan 50 having a plurality of fan blades 52 coupled to a disk 54 in a spaced apart manner. As depicted, the fan blades 52 extend outwardly from disk 54 generally along the radial direction R. Each fan blade 52 is rotatable with the disk 54 about a pitch axis P by virtue of the fan blades 52 being operatively coupled to a suitable pitch change mechanism 56 configured to collectively vary the pitch of the fan blades 52, e.g., in unison.

The gas turbine engine 20 further includes a power gear box 58. The fan blades 52, disk 54, and pitch change mechanism 56 are together rotatable about the longitudinal centerline 22 by the LP shaft 46 across the power gear box 58. The power gear box 58 includes a plurality of gears for adjusting a rotational speed of the fan 50 relative to a rotational speed of the LP shaft 46, such that the fan 50 and the LP shaft 46 may rotate at more efficient relative speeds.

Referring still to the exemplary embodiment of FIG. 2, the disk 54 is covered by rotatable front hub 60 of the fan section 24 (sometimes also referred to as a "spinner"). The front hub 60 is aerodynamically contoured to promote an airflow through the plurality of fan blades 52. Additionally, the exemplary fan section 24 includes an annular fan casing or outer nacelle 62 that circumferentially surrounds the fan 50 and/or at least a portion of the turbomachine 26. The outer nacelle 62 is supported relative to the turbomachine 26 by a plurality of circumferentially spaced struts or outlet guide vanes 64 in the embodiment depicted. Moreover, a downstream section 66 of the outer nacelle 62 extends over an outer portion of the turbomachine 26 to define a bypass airflow passage 68 therebetween.

It should be appreciated, however, that the exemplary gas turbine engine 20 depicted in FIG. 2 is provided by way of example only, and that in other exemplary embodiments, the gas turbine engine 20 may have other configurations. For example, although the gas turbine engine 20 depicted is configured as a ducted gas turbine engine (i.e., including the outer nacelle 62), in other embodiments, the gas turbine engine 20 may be an unducted or non-ducted gas turbine engine (such that the fan 50 is an unducted fan, and the outlet guide vanes 64 are cantilevered from the outer casing 28).

Additionally, or alternatively, although the gas turbine engine 20 depicted is configured as a geared gas turbine engine (i.e., including the power gear box 58) and a variable pitch gas turbine engine (i.e., including a fan 50 configured as a variable pitch fan), in other embodiments, the gas turbine engine 20 may be configured as a direct drive gas turbine engine (such that the LP shaft 46 rotates at the same speed as the fan 50), as a fixed pitch gas turbine engine (such that the fan 50 includes fan blades 52 that are not rotatable about a pitch axis P), or both. It should also be appreciated, that in still other exemplary embodiments, aspects of the present disclosure may be incorporated into any other suitable gas turbine engine. For example, in other exemplary embodiments, aspects of the present disclosure may (as appropriate) be incorporated into, e.g., a turboprop gas turbine engine, a turboshaft gas turbine engine, or a turbojet gas turbine engine.

During operation of the gas turbine engine 20, a volume of air 70 enters the gas turbine engine 20 through an associated inlet 72 of the outer nacelle 62 and fan section 24. As the volume of air 70 passes across the fan blades 52, a first portion of air 74 is directed or routed into the bypass airflow passage 68 and a second portion of air 76 is directed or routed into the working gas flow path 48, or more specifically into the LP compressor 32. The ratio between the first portion of air 74 and the second portion of air 76 is commonly known as a bypass ratio.

As the second portion of air 76 enters the LP compressor 32, one or more sequential stages of low-pressure (LP) compressor stator vanes 78 and low-pressure (LP) compressor rotor blades 80 coupled to the LP shaft 46 progressively compress the second portion of air 76 flowing through the LP compressor 32 enroute to the HP compressor 34. Next, one or more sequential stages of high-pressure (HP) compressor stator vanes 82 and high-pressure (HP) compressor rotor blades 84 coupled to the HP shaft 44 further compress the second portion of air 76 flowing through the HP compressor 34. This provides compressed air to the combustion section 36 where it mixes with fuel and burns to provide combustion gases 86.

The combustion gases 86 are routed through the HP turbine 38 where a portion of thermal and/or kinetic energy from the combustion gases 86 is extracted via sequential stages of high-pressure (HP) turbine stator vanes 88 that are coupled to a turbine casing and high-pressure (HP) turbine rotor blades 90 that are coupled to the HP shaft 44, thus causing the HP shaft 44 to rotate, thereby supporting operation of the HP compressor 34. The combustion gases 86 are then routed through the LP turbine 40 where a second portion of thermal and kinetic energy is extracted from the combustion gases 86 via sequential stages of low-pressure (LP) turbine stator vanes 92 that are coupled to a turbine casing and low-pressure (LP) turbine rotor blades 94 that are coupled to the LP shaft 46, thus causing the LP shaft 46 to rotate, and thereby supporting operation of the LP compressor 32 and/or rotation of the fan 50.

The combustion gases 86 are subsequently routed through the jet exhaust nozzle 42 of the turbomachine 26 to provide propulsive thrust. Simultaneously, the pressure of the first portion of air 74 is substantially increased as it is routed through the bypass airflow passage 68 before it is exhausted from a fan nozzle exhaust section 96 of the gas turbine engine 20, also providing propulsive thrust. The HP turbine 38, the LP turbine 40, and the jet exhaust nozzle 42 at least partially define a hot gas path 98 for routing the combustion gases 86 through the turbomachine 26.

Figure 3:
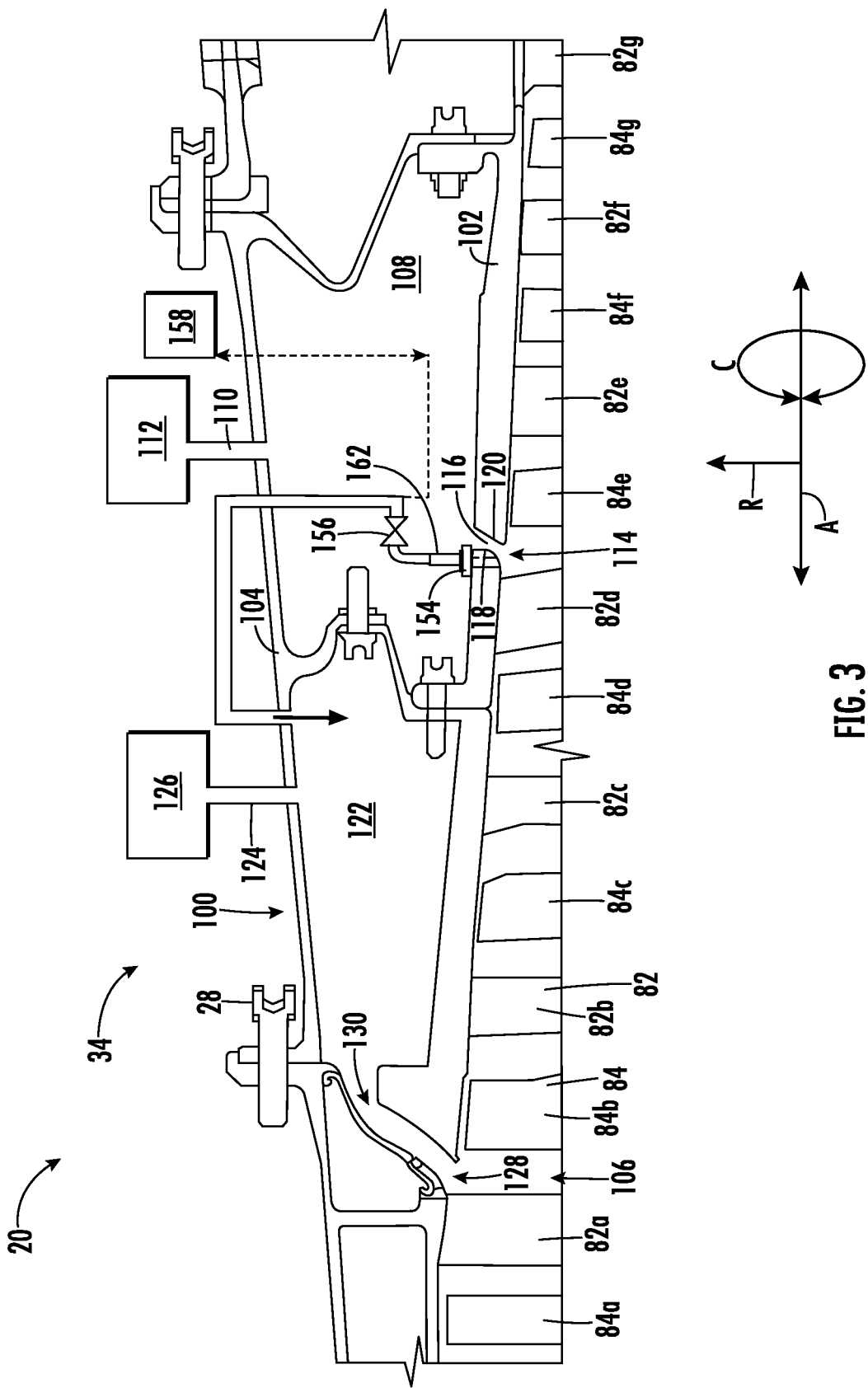
FIG. 3 is an enlarged cross-sectional view of a portion of a high-pressure compressor of the gas turbine engine as shown in FIG. 2, in accordance with an exemplary aspect of the present disclosure.

FIG. 3 is an enlarged cross-sectional view of a portion of the HP compressor 34 of the gas turbine engine 20 as shown in FIG. 2. As shown in FIG. 3, the HP compressor 34 includes a casing 100. The casing 100 can correspond to the outer casing 28 (FIG. 2) or a portion of the outer casing 28. In particular examples, the casing 100 may comprise a plurality of casings. In exemplary embodiments, as shown in FIG. 3, the casing 100 includes an inner casing 102 radially spaced from an outer casing 104 with respect to radial direction R. The inner and outer casings 102, 104 may be coupled together by via fasteners such as bolts.

The inner casing 102 defines, forms, and/or otherwise surrounds a primary flow path 106 for airflow through the HP compressor 34 to the combustion section 36 (shown in FIG. 2). As shown in FIG. 3, the HP compressor stator vanes 82 are coupled to and extend radially inward from the inner casing 102. The HP compressor rotor blades 84 are coupled to and extend radially outward from the HP shaft 44 (FIG. 2) and are disposed between successive rows of the HP compressor stator vanes 82.

As shown in FIG. 3, rows of HP compressor stator vanes 82 are labeled 82a-82g, and rows of the HP compressor rotor blades 84 are labeled 84a-84g. There are multiple HP compressor stator vanes 82 in each respective row 82a-82f, and multiple HP compressor rotor blades 84 arranged in each of the rows 84a-84g. The HP compressor 34 can include any number of rows of stator vanes or rotor blades. In some examples, each row 82a-82g of HP compressor stator vanes 82 and each row 84a-84g of HP compressor rotor blades 84 form a compression stage. For example, the rows 82a and 84a form one stage of the HP compressor 34. The HP compressor 34 may include multiple stages that progressively increase the pressure of the air flowing through the HP compressor 34 toward the combustion section 36 (FIG. 2).

In exemplary embodiments, the inner and outer casings 102, 104 define one or more openings or slots to extract high-pressure air from the primary flow path 106 of the HP compressor 34. This high-pressure air is referred to as "bleed air" because it is "bled" from the HP compressor 34. Bleed air is used for various purposes in the gas turbine engine 20 and/or the aircraft 10. For example, bleed air can be used to cool or reduce the temperature of the HP and LP turbines. Additionally, or alternatively, the bleed air can be used to pressurize certain seals in the gas turbine engine 20, which helps maintain tighter fittings and tolerances. Further, if the gas turbine engine 20 is used on an aircraft, the bleed air can be used to power and/or provide a constant supply of air for one or more systems, such as an environmental control system (ECS) (which provides pressurized and temperature-controlled air to the cabin), a wing anti-icing system, and/or an engine anti-icing system.

In various embodiments, as shown in FIG. 3, the gas turbine engine 20 includes a bleed air cavity 108 (e.g., a plenum, a collection chamber) defined between the inner casing 102 and the outer casing 104. In particular embodiments, the bleed air cavity 108 may also be referred to as a high-pressure (HP) bleed air cavity and/or first bleed air cavity.

During operation, bleed air is extracted from the primary flow path 106 and fills the bleed air cavity 108. One or more hoses or fluid lines 110 are fluidly coupled to the outer casing 104 for routing (e.g., distributing) the bleed air from bleed air cavity 108 to one or more downstream locations and/or systems 112. For example, the downstream locations and/or systems 126 can include the HP and/or LP turbine(s) 38, 40 (FIG. 2) (e.g., for cooling), one or more systems of an Environmental Control System (ECS) such as but not limited to a cabin pressurization system, a wing anti-icing system, an engine anti-icing system, and/or any other location and/or system of the gas turbine engine 20 or the aircraft 10 (shown in FIG. 1).

To supply the bleed air cavity 108 with bleed air, the inner casing 102 includes an opening 114. The opening 114 may be defined by a slot or aperture that extends through the inner casing 102 and circumferentially about the inner casing 102 with respect to circumferential direction C. In various embodiments, as shown in FIG. 3, the opening 114 defines a bleed air channel 116 that provides for fluid communication between the primary flow path 106 and the bleed air cavity 108. The bleed air channel 116 is a least partially defined by an upstream or first wall 118 that is axially spaced from a downstream or second wall 120 with respect to the axial direction A.

The bleed air channel 116 is formed, shaped and/or oriented to direct a portion of the airflow from the primary flow path 106 into the bleed air cavity 108. During operation of the gas turbine engine 20, a portion of the airflow (e.g., high-pressure air) in the primary flow path 106 flows through the opening 114, through the bleed air channel 116, and fills the bleed air cavity 108. In particular embodiments, the bleed air channel 116 is angled or slanted in the downstream direction (e.g., from left to right in FIG. 3). This enables the bleed air to flow efficiently (in the generally downstream direction) into the bleed air cavity 108.

In particular embodiments, as illustrated in FIG. 3, the casing 100 includes a second bleed air cavity 122 (e.g., a plenum, a collection chamber) defined between the inner casing 102 and the outer casing 104. In particular embodiments, the second bleed air cavity 122 may be referred to as a low-pressure (LP) bleed air cavity and may be pressurized at a lower pressure than the pressure in bleed air cavity 108.

During operation, bleed air is extracted from the primary flow path 106 and fills the second bleed air cavity 122. One or more hoses or fluid lines 124 are fluidly coupled to the outer casing 104 for routing (e.g., distributing) the bleed air from the second bleed air cavity 122 to one or more downstream locations and/or systems 126. The downstream locations and/or systems 126 can include the HP and/or LP turbine(s) 38, 40 (FIG. 2) (e.g., for cooling), one or more systems of an Environmental Control System (ECS) such as a cabin pressurization system, a wing anti-icing system, an engine anti-icing system, and/or any other location and/or system of the gas turbine engine 20 or the aircraft 10 (shown in FIG. 1).

To supply the second bleed air cavity 122 with bleed air, the inner casing 102 includes an opening 128. The opening 128 may be defined by a slot or aperture that extends through the inner casing 102 and circumferentially about the inner casing 102 with respect to circumferential direction C. In particular embodiments, as shown in FIG. 3, the opening 128 defines a second bleed air channel 130 that provides for fluid communication between the primary flow path 106 and the second bleed air cavity 122. The second bleed air channel 130 is formed, shaped and/or oriented to direct a portion of the airflow from the primary flow path 106 into the second bleed air cavity 122.

During operation of the gas turbine engine 20, a portion of the airflow (e.g., high-pressure air) from the primary flow path 106 flows through the opening 128, through the second bleed air channel 130, and fills the second bleed air cavity 122. As shown, the second bleed air channel 130 is angled or slanted in the downstream direction (e.g., from left to right in FIG. 3). This enables the bleed air to flow efficiently (in the generally downstream direction) into the second bleed air cavity 122.

The bleed air cavity 108 and the second bleed air cavity 122 are each filled with bleed air from different stages of the HP compressor 34. For example, the second bleed air cavity 122 may receive pressurized air from the primary flow path 106 at an upstream stage of the HP compressor 34 such as but not limited to the $4^{th}$ stage, while bleed air cavity 108 receives higher pressure bleed air as compared with a portion of bleed air flowing into the second bleed air cavity 122 from a later stage of the HP compressor 34, such as but not limited to the $7^{th}$ stage.

In operation, the flow of air into bleed air cavity 108 and the pressure in bleed air cavity 108 depends on the demand from the downstream locations and/or systems 112, 126. In some examples, as shown in FIG. 1, an aircraft has two engines that simultaneously provide bleed air to the downstream locations and/or systems 112, 126. However, upon failure or deactivation of one of the engines, the demand for bleed air from the bleed air cavity 108 of the operative engine significantly increases.

In order to meet this increased demand for bleed air, the bleed air channel 116, particularly the first wall 118 and the second wall 120 are sized and shaped to produce laminar flow through the bleed air channel 116 during these peak or maximum bleed air demand conditions (e.g., maximum demand times). However, during nominal (non-maximum) bleed air demand conditions, flow separation commonly occurs along the first wall 118 of the bleed air channel 116.

Figure 4:
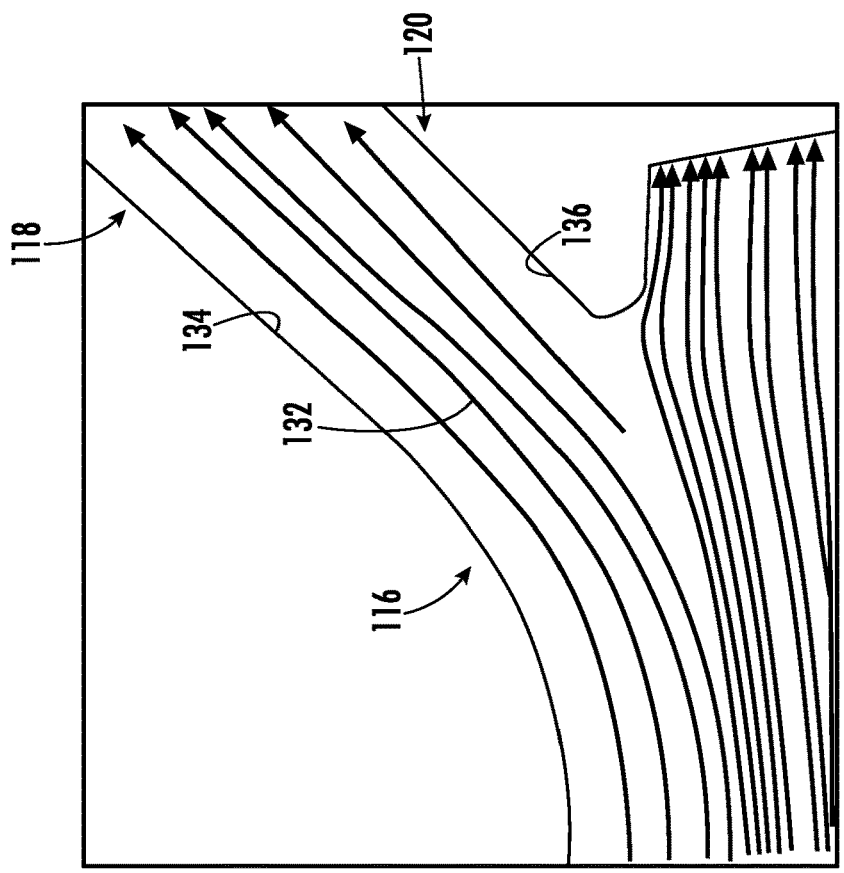
FIG. 4 illustrates a flow stream of bleed air through a bleed air channel during maximum engine demand conditions.

FIG. 4 shows a flow stream of bleed air 132 through bleed air channel 116 during maximum demand conditions (e.g., during failure or deactivation of one of the engines). As shown, the flow stream of bleed air 132 through the bleed air channel 116 is relatively smooth and laminar along an outer surface 134 of the first wall 118 and an outer surface 136 of the second wall 120.

Figure 5:
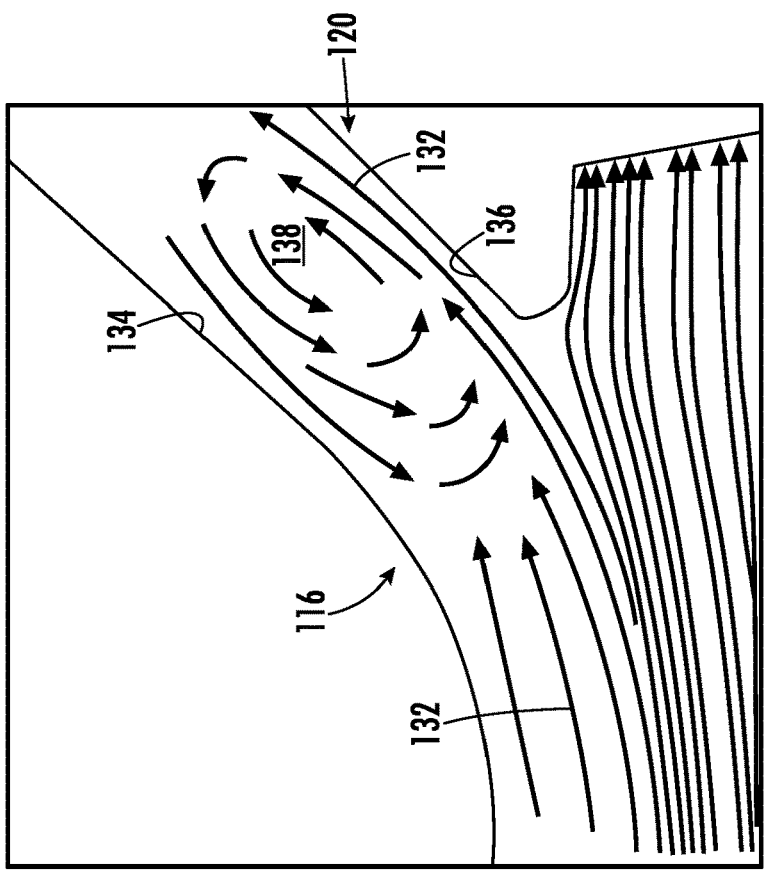
FIG. 5 illustrates a flow stream of bleed air through a bleed air channel during nominal bleed air conditions.

FIG. 5 shows the flow stream of bleed air 132 through the bleed air channel 116 during nominal bleed conditions, such as when both engines are providing bleed air the various systems 112, 126 (FIG. 3). As shown in FIG. 5, flow separation of the flow stream of bleed air 132 occurs in the bleed air channel 116. In particular, the flow stream of bleed air 132 detaches from the outer surface 134 of the first wall 118, which creates recirculation bubble(s) 138 in the bleed air channel 116. The formation of the recirculation bubble(s) 138 limits or reduces the flow stream of bleed air 132 into the bleed air cavity 108 (FIG. 3). As such, bleed air pressure recovery (e.g., the capacity of the bleed air cavity 108 to receive bleed air) during nominal bleed conditions is significantly reduced, which adversely affects the ability of the downstream locations and/or systems 112, 126 to receive a sufficient supply of bleed air in an expedient or desired manner.

FIG. 6 is an enlarged cross section of a portion of the HP compressor 34 as shown in FIG. 3, according to various embodiments of the present disclosure. In exemplary embodiments, as shown in FIG. 6, a plurality of holes 150 is formed along the outer surface 134 of the first wall 118 of the bleed air channel 116. Although three holes 150 are illustrated in FIG. 6, it is to be appreciated that the first wall 118 may include more holes or less holes than is shown. Each hole 150 of the plurality of holes 150 forms a respective flow passage 152 that provides for fluid communication from the primary flow path 106 and/or the bleed air channel 116 to a suction manifold 154. The holes 150 of the plurality of holes 150 are configured, shaped, formed, angled, etc., to energize a fluid boundary layer along the outer surface 134 of the first wall 118. In particular embodiments, the holes 150 include a first row of holes 150(a) that is axially spaced from a second row of holes 150(b) with respect to axial direction A. It is to be appreciated that there may be multiple axially spaced rows including a third row of holes 150(c), etc.

FIG. 7 provides a cross-sectioned, forward looking aft schematic view of a portion of the first wall 118 including the suction manifold 154 and some representative holes 150 of the plurality of holes 150 according to an exemplary embodiment of the present disclosure. As shown in FIG. 7, the plurality of holes 150 is angled $\Theta_R$ relative to radial direction R of the gas turbine engine 20 (FIG. 2). The angle $\Theta_R$ may be set to match or generally match an angle of swirl of the second portion of air 76 as it progresses through the HP compressor 34 (FIG. 2).

In particular embodiments, as shown in FIGS. 3 and 6 collectively, the suction manifold 154 is fluidly coupled to a valve 156. The valve 156 is configured to control flowrate of a portion of the airflow from the primary flow path 106, through the plurality of holes 150, into the suction manifold 154 and out to other locations or systems of gas turbine engine, such as but not limited to the ECS (e.g., for cabin pressurization), the second bleed air cavity 122 or for venting outside of the outer casing 104 to atmosphere such as in the bypass airflow passage 68 (FIG. 2).

Figure 8:
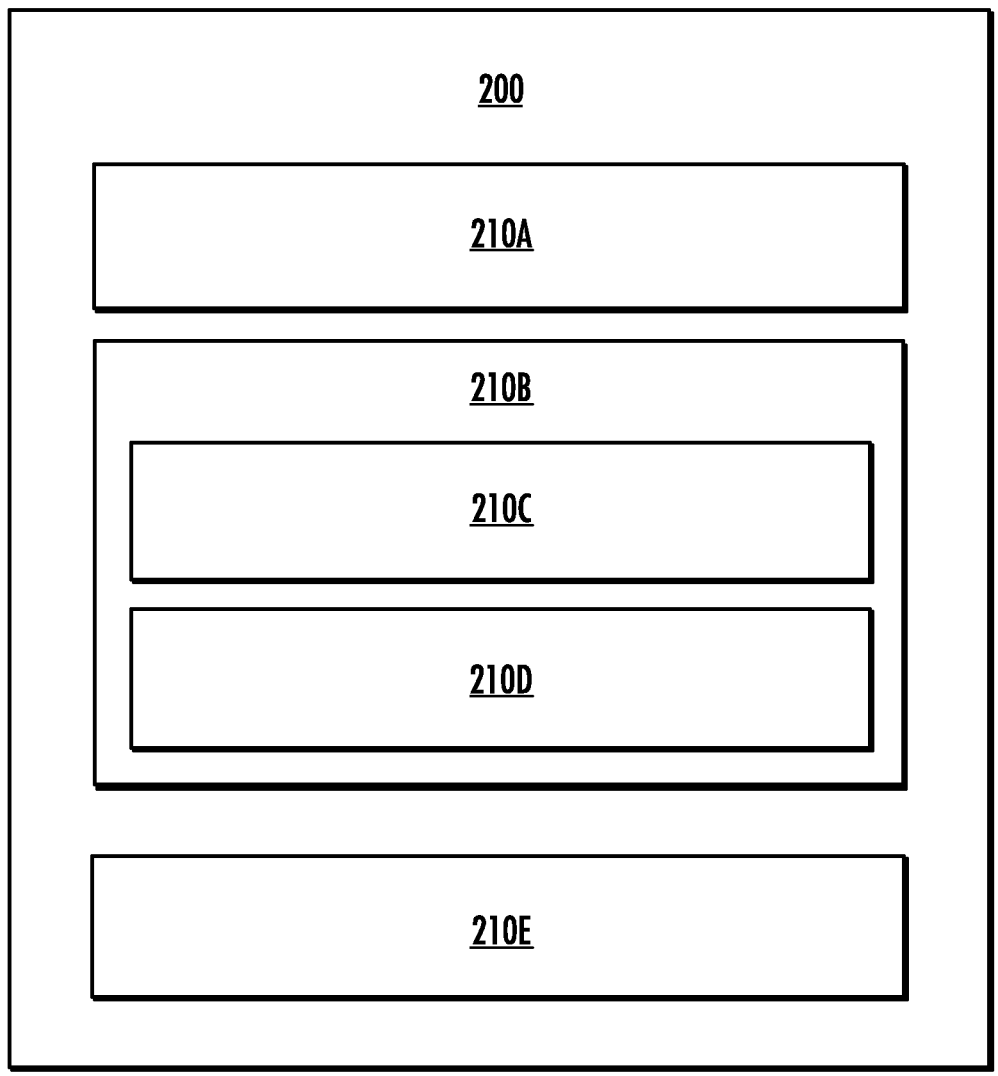
FIG. 8 provides a system diagram of an engine controller in accordance with an exemplary aspect of the present disclosure.

In particular embodiment, as shown in FIG. 3, the valve 156 may be in electronic communication with a controller 158 such as a full authority digital engine (or electronics) control (FADEC) or an electronic engine controller (EEC). FIG. 8 provides a system diagram of an exemplary engine controller 200 as may be representative of controller 158 (FIG. 3). As shown, the engine controller 200 can include one or more processor(s) 210A and one or more memory device(s) 210B. The one or more processor(s) 210A can include any processing device, such as a microprocessor, microcontroller, integrated circuit, logic device, and/or other suitable processing device. The one or more memory device(s) 210B can include one or more computer-readable media, including, but not limited to, non-transitory computer readable medium, RAM, ROM, hard drives, flash drives, and/or other memory devices.

The one or more memory device(s) 210B can store information accessible by the one or more processor(s) 210A, including computer-executable or computer-readable instructions 210C that can be executed by the one or more processor(s) 210A. The instructions 210C can be any set of instructions that when executed by the one or more processor(s) 210A, cause the one or more processor(s) 210A to perform operations, such as actuate the valve 156 between a fully open position, an intermediate position (between fully open and fully closed), and a fully closed position so as to actively control the suction provided at the holes 150 and/or to meter the flow from the suction manifold to points downstream therefrom.

The instructions 210C can be software written in any programming language or can be implemented in hardware or firmware. Additionally, and/or alternatively, the instructions 210C can be executed in logically and/or virtually separate threads on processor(s) 210A. The memory device(s) 210B can further store data 210D that can be accessed by the processor(s) 210A.

The engine controller 200 can also include a network interface 210E used to communicate, for example, with the other components of the gas turbine engine (e.g., via a network). The network interface 210E can include components for interfacing with one or more network(s), including for example, transmitters, receivers, ports, controllers, antennas, and/or other suitable components.

Figure 9:
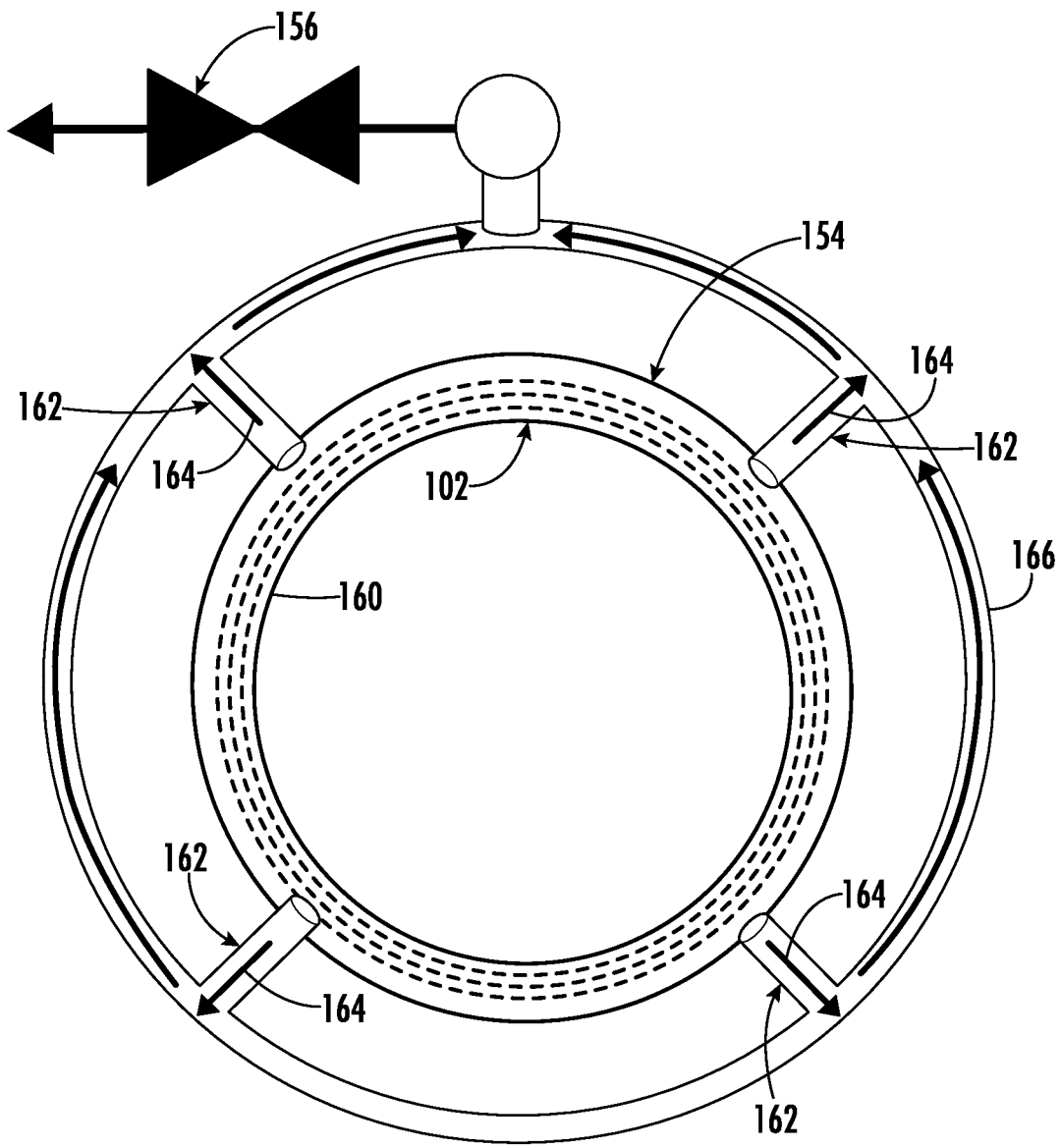
FIG. 9 provides a schematic aft-looking-forward view including a suction manifold as shown in FIGS. 3 and 6, in accordance with an exemplary aspect of the present disclosure.

FIG. 9 provides a schematic aft-looking-forward view including the suction manifold 154 as shown in FIGS. 3 and 6, according to various embodiments of the present disclosure. As show in FIG. 9, the suction manifold 154 may be annular or ring shaped. The suction manifold 154 may extend annularly about an outer surface 160 of the inner casing 102.

As shown in FIGS. 3, 6, and 9 collectively, one or more pipes or tubes 162 is fluidly coupled to the suction manifold 154. As illustrated in FIGS. 6 and 9, the pipe(s) or tube(s) 162 at least partially define(s) a flow path 164 to a lower-pressure region (LPR) of the gas turbine engine 20 (FIG. 2) that has a lower pressure than the bleed air cavity 108. The lower pressure region may include but is not limited to the second bleed air cavity 122 (FIGS. 3 and 6), the bypass airflow passage 68 (FIG. 2), and/or downstream locations and/or systems 112 (FIG. 3).

In particular embodiments, the pipe(s) or tube(s) 162, as shown in FIGS. 3, 6, and 8 collectively, are fluidly coupled to the valve 156. In certain configurations, the pipe(s) or tube(s) 162 may be fluidly coupled to the valve 156 via an outer manifold 166. The outer manifold 166 may at least partially circumferentially surround the suction manifold 154.

Figure 10:
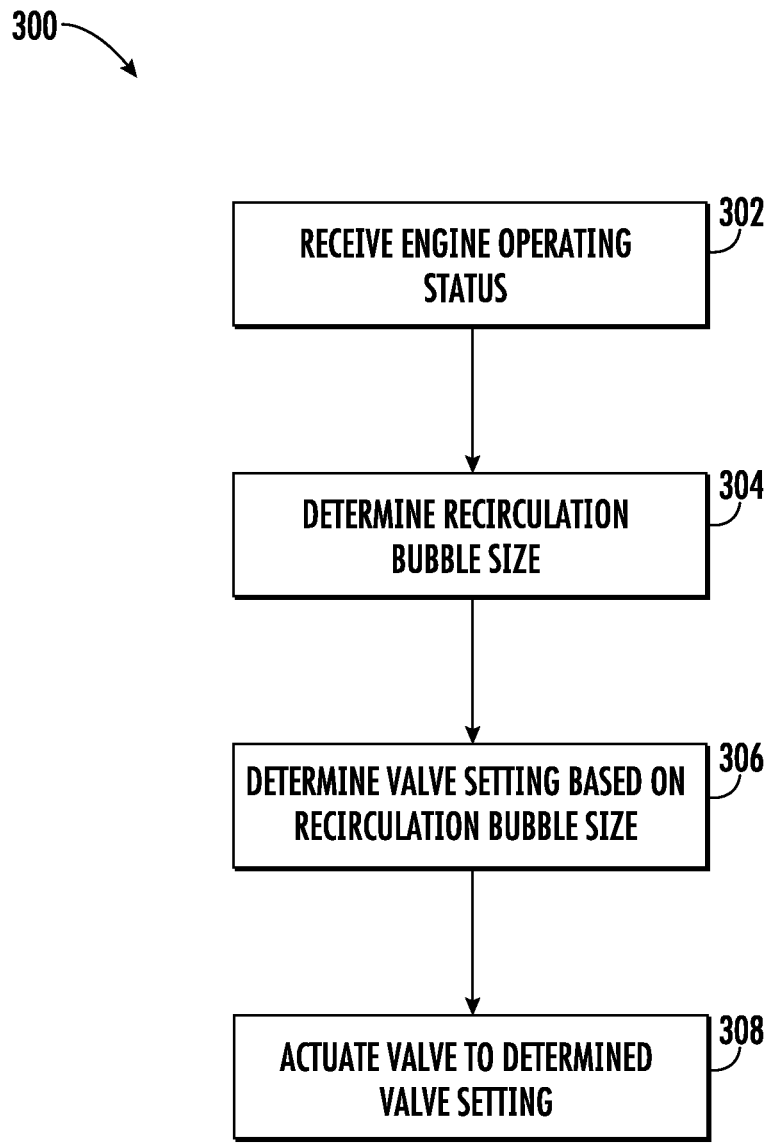
FIG. 10 provides a flow diagram of an exemplary method for improving bleed air pressure recovery, in accordance with an exemplary aspect of the present disclosure.

The various embodiments provided herein in FIGS. 3, 4, 5, 6, 7, 8 and 9 provide for a method of operating the gas turbine engine 20 (FIG. 2). FIG. 10 provides a flow diagram of an exemplary method 300 for improving bleed air pressure recovery. At 302, method 300 includes receiving engine operating status at the controller 158. The operating status may include one or more of the current engine power setting, mass flow rate through the HP compressor, the engine bleed air mass rate, aircraft system bleed air flow rate requirements, etc. At 304, method 300 includes determining at the controller 158 (FIG. 3) (e.g., sensing, measuring or calculating) recirculation bubble size in the bleed air channel 116 (FIG. 3) and suction flow requirement of the gas turbine engine 20. If the recirculation bubble size is greater than a predetermined threshold value, method 300 includes at 306 determining a proper valve opening setting, and at 308 method 300 further includes actuating the valve 156 (partially open or fully open) to increase or decrease suction through the holes 150 to energize the flow stream of bleed air 132 along the outer surface 134 of the first wall 118, thereby reducing or eliminating the recirculation bubble size. If the recirculation bubble size is below the predetermined threshold value, the method 300 may include actuating the valve to a fully closed position, thereby eliminating the suction at the holes 150.

With references to FIGS. 2 through 10 collectively, providing suction via the holes 150 along the first wall 118 at the bleed air channel 116 minimizes flow separation of the flow stream of bleed air 132 along the outer surface 134 of the first wall 118 and more particularly within the bleed air channel 116. This leads to a faster pressure recovery when the gas turbine engine 20 is operating in a nominal or high-power demand condition as compared to when the suction holes are not present.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

This written description uses examples to disclose the present disclosure, including the best mode, and to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A gas turbine engine, comprising: a compressor including an inner casing and an outer casing, the inner casing defining a primary flow path for airflow through the compressor, the inner casing and the outer casing defining a first bleed air cavity therebetween, the inner casing at least partially defining a first bleed air channel between the primary flow path and the first bleed air cavity, wherein the first bleed air channel is defined between a first wall and a second wall, the first wall being upstream from the second wall; wherein the first wall includes a plurality of holes in fluid communication with the primary flow path and fluidly coupled to a suction manifold, wherein the plurality of holes is configured to energize a fluid boundary layer along the first wall.

The gas turbine engine of the preceding clause, wherein the suction manifold is fluidly coupled to a valve, wherein the valve is configured to control flowrate of a portion of the airflow from the primary flow path, through the plurality of holes and into the suction manifold.

The gas turbine engine of any preceding clause, wherein the plurality of holes is angled relative to a radial direction of the gas turbine engine.

The gas turbine engine of any preceding clause, wherein the plurality of holes includes a first row of holes and a second row of holes, wherein the first row of holes is axially spaced from the second row of holes with respect to an axial centerline of the gas turbine engine.

The gas turbine engine of any preceding clause, wherein the compressor further includes a second bleed air channel and a second bleed air cavity in fluid communication with the primary flow path, wherein the suction manifold is fluidly coupled to the second bleed air cavity.

The gas turbine engine of any preceding clause, wherein the second bleed air cavity is pressurized at a lower pressure than the first bleed air cavity.

The gas turbine engine of any preceding clause, wherein the first bleed air channel of the first bleed air cavity is disposed downstream from the second bleed air channel with respect to the airflow through the compressor.

The gas turbine engine of any preceding clause, wherein the suction manifold extends circumferentially about an outer surface of the inner casing.

The gas turbine engine of any preceding clause, wherein the suction manifold is fluidly coupled to an outer manifold via one or more pipes.

The gas turbine engine of any preceding clause, wherein the compressor includes a low-pressure compressor and a high-pressure compressor in serial flow order, wherein the first bleed air channel and the first bleed air cavity are defined within the high-pressure compressor.

An aircraft, comprising: a fuselage, a wing attached to the fuselage, and a gas turbine engine, the gas turbine engine comprising: a compressor including an inner casing and an outer casing, the inner casing defining a primary flow path for airflow through the compressor, the inner casing and the outer casing defining a first bleed air cavity therebetween, the inner casing at least partially defining a first bleed air channel between the primary flow path and the first bleed air cavity to direct a portion of the airflow from the primary flow path into the first bleed air cavity, wherein the first bleed air channel is defined between a first wall and a second wall, the first wall being upstream from the second wall. The first wall includes a plurality of holes in fluid communication with the primary flow path and fluidly coupled to a suction manifold, and wherein the plurality of holes is configured to energize a fluid boundary layer along the first wall.

The aircraft of the preceding clause, wherein the suction manifold is fluidly coupled to a valve, wherein the valve is configured to control flowrate of a portion of the airflow from the primary flow path, through the plurality of holes and into the suction manifold.

The aircraft of any preceding clause, wherein the plurality of holes is angled relative to a radial direction of the gas turbine engine.

The aircraft of any preceding clause, wherein the plurality of holes includes a first row of holes and a second row of holes, wherein the first row of holes is axially spaced from the second row of holes with respect to an axial centerline of the gas turbine engine.

The aircraft of any preceding clause, wherein the compressor further includes a second bleed air channel and a second bleed air cavity in fluid communication with the primary flow path, wherein the suction manifold is fluidly coupled to the second bleed air cavity.

The aircraft of any preceding clause, wherein the second bleed air cavity is pressurized at a lower pressure than the first bleed air cavity.

The aircraft of any preceding clause, wherein the first bleed air channel of the first bleed air cavity is disposed downstream from the second bleed air channel with respect to the airflow through the compressor.

The aircraft of any preceding clause, wherein the suction manifold extends circumferentially about an outer surface of the inner casing.

The aircraft of any preceding clause, wherein the suction manifold is fluidly coupled to an outer manifold via one or more pipes.

The aircraft of any preceding clause, wherein the compressor includes a low-pressure compressor and a high-pressure compressor in serial flow order, wherein the first bleed air channel and the first bleed air cavity are defined within the high-pressure compressor.

A method for improving bleed air pressure recovery includes receiving engine operating status at a controller; determining at the controller, recirculation bubble size in a first bleed air channel and suction flow requirement of the gas turbine engine. If the recirculation bubble size is greater than a predetermined threshold value, determining a proper valve opening setting, actuating the valve to increase or decrease suction through the holes to reduce or eliminate the recirculation bubble size.

The method of the preceding clause further includes actuating the valve to a fully closed position if the recirculation bubble size is below the predetermined threshold value to eliminate suction at the holes.

We claim:

1. A gas turbine engine, comprising:
   a compressor including an inner casing and an outer casing, the inner casing defining a primary flow path for airflow through the compressor, the inner casing and the outer casing defining a first bleed air cavity and a second bleed air cavity therebetween, the inner casing at least partially defining a first bleed air channel between the primary flow path and the first bleed air cavity, wherein the first bleed air channel is defined between a first wall and a second wall, the first wall being upstream from the second wall,
   wherein the first wall includes a plurality of holes in fluid communication with the primary flow path and fluidly coupled to a suction manifold, wherein the suction manifold is disposed within the first bleed air cavity and is fluidly coupled to the second bleed air cavity, and wherein the plurality of holes is configured to energize a fluid boundary layer along the first wall; and
   a valve disposed within the first bleed air cavity, wherein the valve is configured to control a flowrate of a portion of the airflow from the primary flow path, through the plurality of holes, into the suction manifold, and into the second bleed air cavity.

2. The gas turbine engine of claim 1, wherein the plurality of holes is angled relative to a radial direction of the gas turbine engine.

3. The gas turbine engine of claim 1, wherein the plurality of holes includes a first row of holes and a second row of holes, wherein the first row of holes is axially spaced from the second row of holes with respect to an axial centerline of the gas turbine engine.

4. The gas turbine engine of claim 1, wherein the compressor further includes a second bleed air channel in fluid communication with the second bleed air cavity and in fluid communication with the primary flow path.

5. The gas turbine engine of claim 4, wherein the second bleed air cavity is pressurized at a lower pressure than the first bleed air cavity.

6. The gas turbine engine as in claim 4, wherein the first bleed air channel of the first bleed air cavity is disposed downstream from the second bleed air channel with respect to the airflow through the compressor.

7. The gas turbine engine of claim 1, wherein the suction manifold extends circumferentially about an outer surface of the inner casing.

8. The gas turbine engine of claim 1, wherein the suction manifold is fluidly coupled to an outer manifold via one or more pipes.

9. The gas turbine engine of claim 1, wherein the compressor includes a low-pressure compressor and a high-pressure compressor in serial flow order, wherein the first bleed air channel and the first bleed air cavity are defined within the high-pressure compressor.

10. An aircraft, comprising:
    a fuselage;
    a wing attached to the fuselage; and
    a gas turbine engine, the gas turbine engine comprising:
      a compressor including an inner casing and an outer casing, the inner casing defining a primary flow path for airflow through the compressor, the inner casing and the outer casing defining a first bleed air cavity and a second bleed air cavity therebetween, the inner casing at least partially defining a first bleed air channel between the primary flow path and the first bleed air cavity to direct a portion of the airflow from the primary flow path into the first bleed air cavity, wherein the first bleed air channel is defined between a first wall and a second wall, the first wall being upstream from the second wall,
    wherein the first wall includes a plurality of holes in fluid communication with the primary flow path and fluidly coupled to a suction manifold, wherein the suction manifold is disposed within the first bleed air cavity and is fluidly coupled to the second bleed air cavity, and wherein the plurality of holes is configured to energize a fluid boundary layer along the first wall; and
    a valve disposed within the first bleed air cavity, wherein the valve is configured to control a flowrate of a portion of the airflow from the primary flow path, through the plurality of holes, into the suction manifold, and into the second bleed air cavity.

11. The aircraft of claim 10, wherein the plurality of holes is angled relative to a radial direction of the gas turbine engine.

12. The aircraft of claim 10, wherein the plurality of holes includes a first row of holes and a second row of holes, wherein the first row of holes is axially spaced from the second row of holes with respect to an axial centerline of the gas turbine engine.

13. The aircraft of claim 10, wherein the compressor further includes a second bleed air channel in fluid communication with the second bleed air cavity and in fluid communication with the primary flow path.

14. The aircraft of claim 13, wherein the second bleed air cavity is pressurized at a lower pressure than the first bleed air cavity.

15. The aircraft of claim 13, wherein the first bleed air channel of the first bleed air cavity is disposed downstream from the second bleed air channel with respect to the airflow through the compressor.

16. The aircraft of claim 11, wherein the suction manifold extends circumferentially about an outer surface of the inner casing.

17. The aircraft of claim 10, wherein the suction manifold is fluidly coupled to an outer manifold via one or more pipes.

18. The aircraft of claim 10, wherein the compressor includes a low-pressure compressor and a high-pressure compressor in serial flow order, wherein the first bleed air channel and the first bleed air cavity are defined within the high-pressure compressor.

* * * * *